(12) United States Patent
Geck et al.

(10) Patent No.: US 7,719,261 B2
(45) Date of Patent: May 18, 2010

(54) METHODS AND SYSTEMS FOR CALIBRATING A SENSOR USING A VECTOR FIELD

(75) Inventors: Friedrich Geck, Mt. Airy, MD (US); Matthew G. Liberty, Potomac, MD (US); Mark Turner, Ijamsville, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 764 days.

(21) Appl. No.: 11/605,050

(22) Filed: Nov. 27, 2006

(65) Prior Publication Data

US 2007/0124097 A1 May 31, 2007

Related U.S. Application Data

(60) Provisional application No. 60/740,021, filed on Nov. 28, 2005.

(51) Int. Cl.
*G01R 35/00* (2006.01)
*G01D 18/00* (2006.01)
(52) U.S. Cl. .................... 324/202; 73/1.01; 702/104
(58) Field of Classification Search ............... 324/202; 702/85–86, 104; 73/1.01, 1.75–1.76, 1.79, 73/1.82, 1.84; 342/165
See application file for complete search history.

(56) References Cited

U.S. PATENT DOCUMENTS 6,647,352 B1 * 11/2003 Horton ................... 702/151
2006/0058961 A1 * 3/2006 Chappell et al. ......... 701/220

* cited by examiner

*Primary Examiner*—Bot L LeDynh
(74) *Attorney, Agent, or Firm*—Potomac Patent Group PLLC

(57) ABSTRACT

Systems and methods according to exemplary embodiments address, among other features, the area of calibrating a sensor using a constant vector field. In one exemplary embodiment, a method for calibrating a sensor includes the steps of placing the sensor in a cube, rotating the cube between a plurality of different orientations, collecting at least one reading from the sensor from each of the plurality of different orientations and calibrating the sensor using the collected readings.

25 Claims, 3 Drawing Sheets

METHODS AND SYSTEMS FOR CALIBRATING A SENSOR USING A VECTOR FIELD

RELATED APPLICATIONS

This application is related to, and claims priority from, U.S. Provisional Patent Application Ser. No. 60/740,021 filed on Nov. 28, 2005, entitled "Methods and Systems for Calibrating a Sensor Using a Vector Field", the disclosure of which is incorporated here by reference.

BACKGROUND

The present invention describes methods and systems for calibrating a sensor using a vector field.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions have not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation.

A relatively new type of remote control devices is sometimes referred to as a "3D pointing device." The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device and another device may be performed wirelessly or via a wire connecting the 3D pointing device to another device. Thus "3D pointing" differs from, for example, conventional computer mouse pointing techniques which use a surface, e.g., a desk surface or mousepad, as a proxy surface from which relative movement of the mouse is translated into cursor movement on the computer display screen. An example of a 3D pointing device can be found in U.S. patent application Ser. No. 11/119,663, entitled "3D Pointing Devices and Methods", the disclosure of which is incorporated by reference.

The '663 application describes, among other things, 3D pointers which enable the translation of movement, e.g., gestures or rotational movement of the handheld, into commands to a user interface. User movement of 3D pointing can be defined, for example, in terms of a combination of x-axis attitude (roll), y-axis elevation (pitch) and/or z-axis heading (yaw) motion of the 3D pointing device. Additionally, it is anticipated that 3D pointing devices will be held by a user in front of a display and that motion of the 3D pointing device will be translated by the 3D pointing device into output which is usable to interface with information displayed on a screen. According to an exemplary embodiment in the '663 application, two rotational sensors and one accelerometer can be employed as sensors in a 3D pointing device which can be used to sense motion of the pointing device. Alternatively, other sensors can be used in 3D pointing devices, such as magnetometers.

However, using magnetometers in 3D pointing applications requires a certain degree of accuracy in motion detection by the magnetometer. This, in turn, suggests the usefulness of calibrating the magnetometers. A currently used method for calibrating magnetometers involves using Helmholtz coils. A Helmholtz coil system generates a magnetic field of known size and uniformity. Typically a basic system consists of two identically wound, layered coils that are wired in series. The coils consist of a specific geometry wherein the mean coil spacing is equal to the mean radius. More complex Helmholtz coil systems can be designed for a variety of purposes.

However, there is still significant room for alternative methods for calibrating magnetometers, e.g., those magnetometers (or other sensors) used in 3D pointing devices.

SUMMARY

Systems and methods according to the present invention address these needs and others by providing a calibration tool for calibrating the sensor(s) in a 3D pointing device.

According to an exemplary embodiment of the present invention a method for calibrating a sensor includes the steps of placing the sensor in a cube, rotating the cube between a plurality of different orientations, collecting at least one reading from the sensor from each of the plurality of different orientations and calibrating the sensor using the collected readings.

According to another exemplary embodiment of the present invention a system for calibrating a sensor includes a sensor to be calibrated, a cube within which the sensor is mounted and a cube holder on which the cube can be rotated between a plurality of measurement positions.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Described herein are methods and systems for calibrating a sensor using a constant vector field. The exemplary embodiment described below uses Earth's magnetic field to calibrate a 3-D magnetometer, however the present invention can be used to calibrate other types of sensors in other ways, e.g., accelerometers. Exemplary embodiments of the present invention accurately orient the sensor in multiple positions to the vector field enabling the sensor to measure multiple readings of constant magnitude. The actual values measured by the sensor are known due to the fixed orientations achieved by the exemplary embodiments thereby allowing for a calibration of the device.

Figure 1:
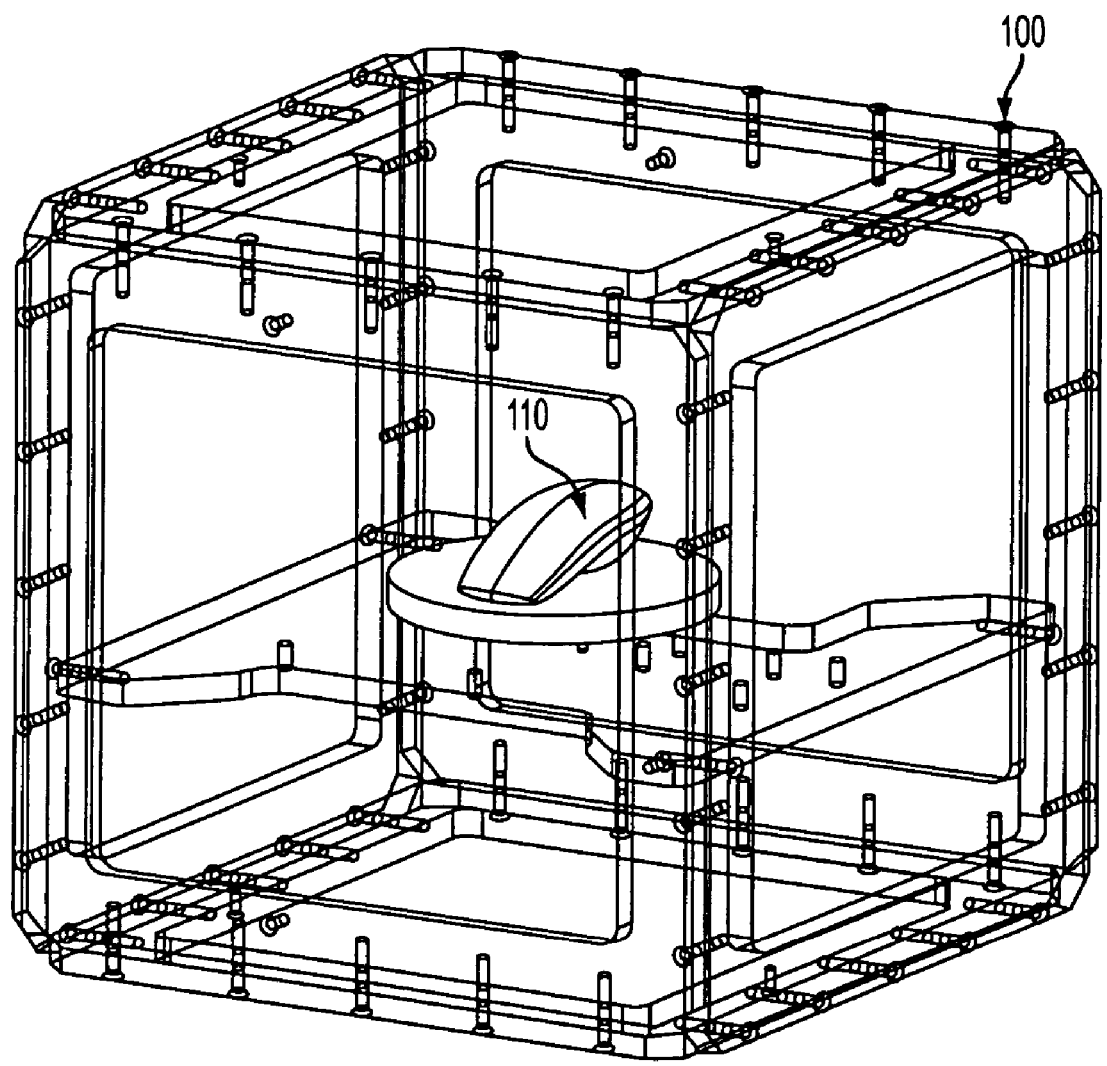
FIG. 1 shows an exemplary calibration cube and sensor according to an exemplary embodiment of the present invention
Figure 2:
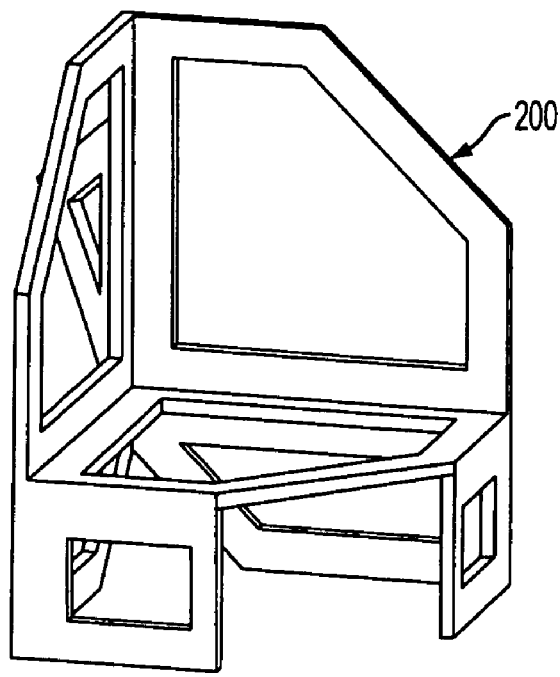
FIG. 2 depicts an exemplary cube holder A according to an exemplary embodiment of the present invention.
Figure 3:
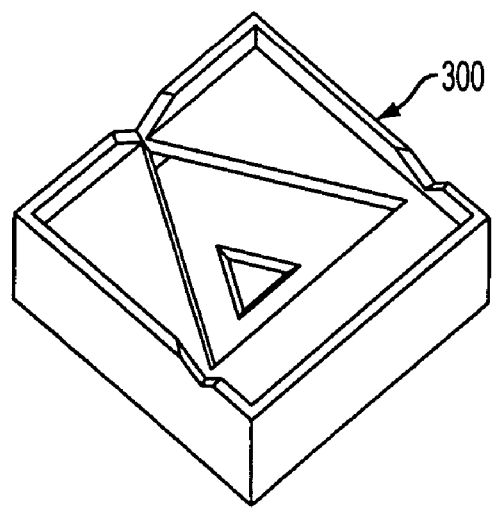
FIG. 3 depicts an exemplary cube holder B according to an exemplary embodiment of the present invention.

According to one exemplary embodiment of the present invention, shown in FIG. 1, a system includes a calibration cube 100 and a sensor under calibration 110. The cube 100 can be accurately mounted in different orientations in a cube holder 200 (shown in FIG. 2). Another type of cube holder 300 is shown in FIG. 3. The sensor under calibration 110 is located, in this example, at the center of the calibration cube 100. Due to the design of the cube 100 and the holder 200 or 300, the sensor will always be located in the same place in space regardless of the orientation of the cube. Keeping the sensor 110 in the same absolute position for all orientations of the cube 100 is desirable to minimize the effects of any divergence of the vector field. The sensor model determines the measured output of a sensor due to a known input. The different orientations determine the input vector measured by the sensor. By fitting the model parameters, a suitable calibration solution may be found that predicts the actual input given a measured sensor value. Additionally the cube holder should be oriented such that the vector will produce different readings for every orientation. For example, if the vector is normal to the face, then some orientations can provide duplicate information which could create a reduced data set and may not be sufficient to perform the calibration.

Figure 4:
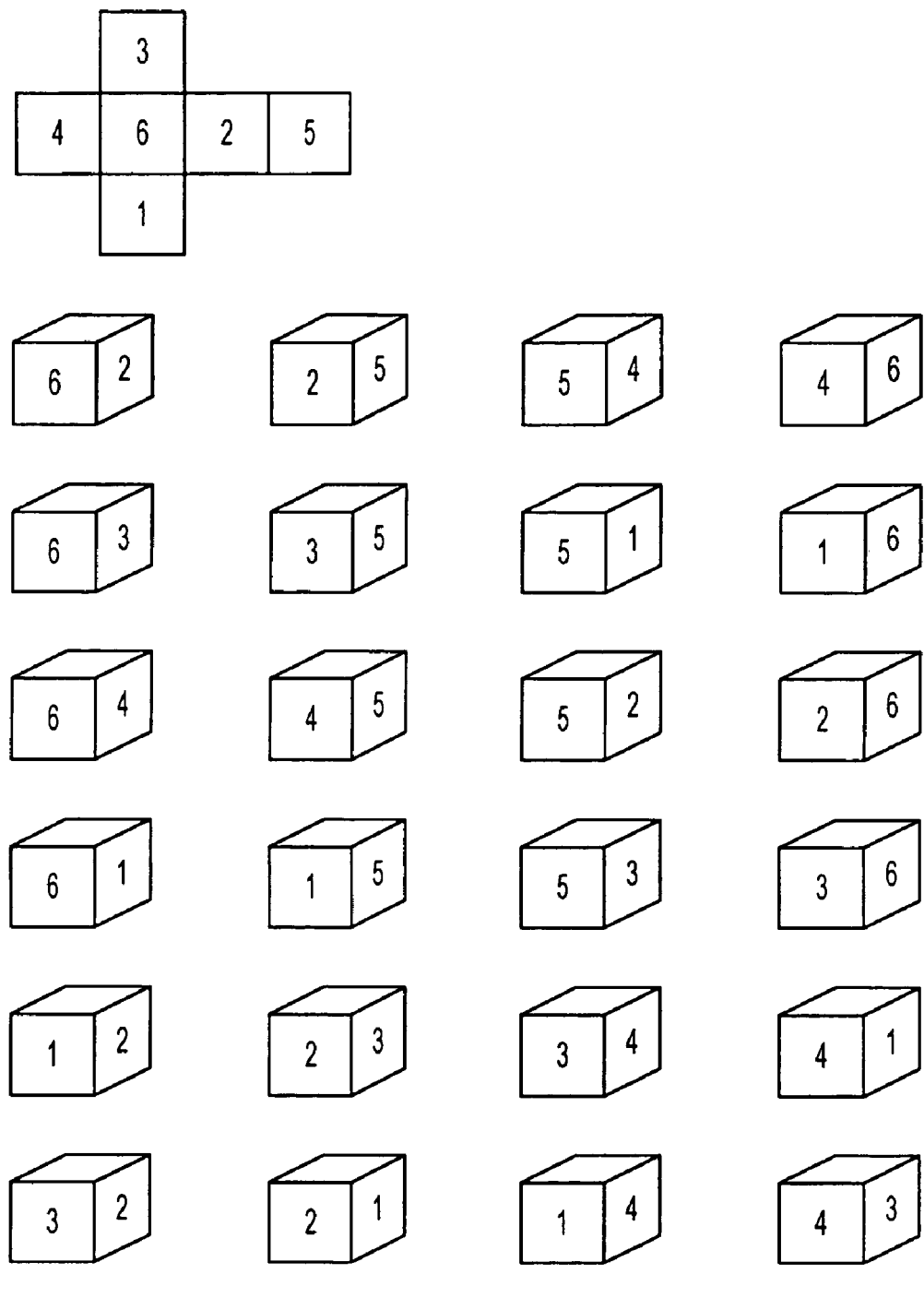
FIG. 4 illustrates an exemplary rotation sequence according to an exemplary embodiment of the present invention.

More specifically, in this exemplary embodiment, the sensor under calibration 10 is mounted in the cube 100. The cube 100, and hence the sensor under calibration, is accurately mounted in different orientations in a holder 200 or 300. In this exemplary embodiment, twenty-four (24) different cube orientations are achieved by placing the cube faces flush to the holder surface. The sensor readings are collected for each orientation by the supporting test equipment. The collected values may either be a single reading from each orientation, multiple readings from each orientation or a single aggregate value from each orientation. The operator rotates the cube according to a predetermined rotation sequence, an example of which is shown in FIG. 4.

The multiple readings are then processed through the sensor model to produce the sensor model calibration. The sensor model determines the minimum number of points required for calibration. Additional points beyond the minimum may help to reduce the calibration error. This exemplary embodiment uses the following sensor model:

$$R_I * H_E = a_s * R * f(M/m_s) \tag{1}$$

Where $a_s$ and $m_s$ are arbitrary scaling vectors for improved model convergence.

M is the 3×1 vector of the sensor measurement.

R is the 3×3 linear transformation matrix. Note that R includes rotation, scale, and skew.

$R_I$ is the 3×3 rotation matrix that corresponds to the placement of the cube in the holder.

$H_E$ is the actual value of the vector. Note that $H_E$ can be represented in spherical coordinates by:

$H_M$*[sin(θ)*cos(φ), sin(θ)*sin(φ), cos(θ)] where $H_M$ is the magnitude of the vector.

f is the transformation function.

Those skilled in the art will recognize that the transformation function is generic and related to the sensor under calibration.

This exemplary embodiment of the present invention uses the transformation function:

$$f(x, y, z) = \begin{Bmatrix} k_{10} + x + k_{12}x^2 + k_{13}x^3 \\ k_{20} + y + k_{22}y^2 + k_{23}y^3 \\ k_{30} + z + k_{32}z^2 + k_{33}z^3 \end{Bmatrix} \quad (2)$$

Thus, in this exemplary embodiment, the transformation function f is defined by the 3×3 calibration parameter matrix, K. Calibration can be performed according to this exemplary embodiment using a least squares fit between the left and right hand sides of equation (1) using a large scale field solver. The field solver finds appropriate values for R and K. Note that the field solver can just as easily find θ and φ along with R and K. Therefore, the present invention can calibrate even when the vector direction of $H_E$ is not known. Each orientation with the collected values results in 3 equations. In the exemplary embodiment with $H_E$ calibration, the model includes 20 total variables requiring a minimum of 7 points, however those skilled in the art will appreciate that other exemplary embodiments will have varying numbers of variables and use fewer or more minimum data points.

Various exemplary methods for processing the calibration data are possible. In one exemplary embodiment, the cube is in communications with a computer either via a wireline connection or a wireless connection. The computer takes the raw data from the cube 100 and processes the raw data into calibration information for the sensor 110. The calibration information is then sent to sensor 110. According to another exemplary embodiment of the present invention, the sensor 110 is in communication with cube 100. The cube 100 collects the raw data and transmits the raw data to the sensor 110. The sensor 110 has an onboard processor capable of processing the raw data into the desired calibration information. Note that the cube 100 can have a communications module (not shown) mounted on it for communications purposes.

Numerous variations and adaptations of the above-described exemplary embodiment may be provided. For example, the cube holder may contain additional supports for additional cube orientations. Other embodiments of the present invention include supporting the cube 100 along an edge at an angle or supporting the cube 100 along a corner at an angle. Both cube holder 200 and cube holder 300 have provisions for mounting orientations beyond just the cube faces. The cube holder can still be designed such that the sensor is maintained in the same position regardless of orientation. The cube holder could also be designed to include any of the above mounting options in the same physical device. The exemplary embodiments described above operate by having a known sequence of $R_I$. The present invention can be extended to include additional sensors to automatically determine the appropriate value for $R_I$. With automatic $R_I$ determination, the system can recover from operator errors and resequence the collected values before determining the model parameters.

Among other features, these exemplary embodiments require no complicated mechanical design, no automated moving parts and are achievable at low-cost. These exemplary embodiments also require no external devices, such as a Helmholtz coil to create or manipulate the input vector field. These exemplary designs are also effective under vector fields with a gradient without additional calibration since the sensor under calibration always measures the field from the same location in space.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for calibrating a sensor comprising the steps of:
    placing the sensor in a cube;
    rotating said cube between a plurality of different orientations;
    collecting at least one reading from said sensor from each of said plurality of different orientations; and
    calibrating said sensor using said collected readings, wherein said sensor is a magnetometer.

2. The method of claim 1, further comprising the steps of:
    placing said cube in a cube holder; and
    rotating said cube between said plurality of different orientations within said cube holder.

3. The method of claim 2, wherein said step of rotating occurs according to a predetermined rotation sequence.

4. The method of claim 1, wherein said collected readings are processed through a sensor model.

5. The method of claim 4, wherein said sensor model is the following equation:
    $R_I * H_E = a_s * R * f(M/m_s)$, wherein $a_s$ and $m_s$ are arbitrary scaling vectors, M is the 3×1 vector of said sensor measurement, R is a 3×3 rotation matrix that includes rotation, scale and skew, $R_I$ is a 3×3 rotation matrix corresponding to a placement of said cube in said cube holder, $H_E$ is a value of said vector, and f is a transformation function.

6. The method of claim 5, wherein $H_E$ is represented in spherical coordinates.

7. The method of claim 1, wherein said step of collecting further comprises transmitting said at least one reading from said sensor from each of said plurality of different orientations to a computing device for processing.

8. The method of claim 7, wherein said step of calibrating said sensor using said collected readings further comprises receiving processed data from said computing device.

9. The method of claim 8, wherein said sensor is linked to said computing device for processing.

10. The method of claim 1, further comprising the step of calibrating the vector direction.

11. A system for calibrating a sensor comprising:
    a sensor to be calibrated;
    a cube within which said sensor is mounted, wherein said sensor is a magnetometer; and
    a cube holder on which said cube can be rotated between a plurality of measurement positions.

12. The system of claim 11, wherein said cube collects at least one reading from said sensor from each of said plurality of measurement positions.

13. The system of claim 11, wherein rotation occurs according to a predetermined rotation sequence.

14. The system of claim 11, wherein readings are collected at each one of said plurality of measurement positions by a sensor model.

15. The system of claim 14, wherein said sensor model is the following equation:

$R_I * H_E = a_s * R * f(M/m_s)$, wherein $a_s$ and $m_s$ are arbitrary scaling vectors, M is the 3×1 vector of said sensor measurement, R is a 3×3 rotation matrix that includes rotation, scale and skew, $R_I$ is a 3×3 rotation matrix corresponding to a placement of said cube in said cube holder, $H_E$ is a value of said vector, and f is a transformation function.

16. The system of claim 15, wherein $H_E$ is represented in spherical coordinates.

17. The system of claim 12, wherein said cube transmits collected data to a computing device for processing.

18. The system of claim 17, wherein said sensor receives processed data from a computing device for calibration.

19. The system of claim 18, wherein said sensor is linked to said computing device.

20. The system of claim 11, wherein said sensor is calibrated for the vector direction.

21. A system for calibrating a sensor comprising:
means for placing the sensor in a cube;
means for rotating said cube between a plurality of different orientations;
means for collecting at least one reading from said sensor from each of said plurality of different orientations; and
means for calibrating said sensor using said collected readings, wherein said sensor is a magnetometer.

22. The method of claim 1, further comprising:
using a constant vector field for reading, wherein said constant vector field allows said sensor to measure multiple readings of a constant magnitude.

23. The method of claim 3, wherein said predetermined rotation sequence includes twenty four different cube orientations.

24. The system of claim 11, wherein a constant vector field is used for reading, further wherein said constant vector field allows said sensor to measure multiple readings of a constant magnitude.

25. The system of claim 13, wherein said predetermined rotation sequence includes twenty four different cube orientations.

* * * * *